J. F. CURTICE.
Car Brake Shoe.

No. 9,329. Reissued Aug. 3, 1880.

Witnesses
Leo Rosenberg
R. Francis Wheeler

Inventor
John F. Curtice
by R. R. Voorhees
Attorney

UNITED STATES PATENT OFFICE.

JOHN F. CURTICE, OF FORT WAYNE, INDIANA.

CAR-BRAKE SHOE.

SPECIFICATION forming part of Reissued Letters Patent No. 9,329, dated August 3, 1880.

Original No. 217,996, dated July 29, 1879. Application for reissue filed June 14, 1880.

*To all whom it may concern:*

Be it known that I, JOHN F. CURTICE, of Fort Wayne, in the county of Allen and State of Indiana, have invented a new and useful Improvement in Car-Brake Shoes, which improvement is fully set forth and illustrated in the following specification and accompanying drawings.

The object of the invention is to provide a brake-shoe whose improved adhesive efficiency as a frictional brake shall be supplemented, in the wear and strain of service, by increased durability and strength, while possessing diminished weight compared with the weight of brake-shoes heretofore commonly used.

The invention consists, therefore, of but two parts—the one of wrought-iron or other suitable metal or material, the other of cast-iron—the said parts being so united and secured together as to produce a brake-shoe of composite structure and face, as is hereinafter more specifically set forth and claimed.

Figure 1:
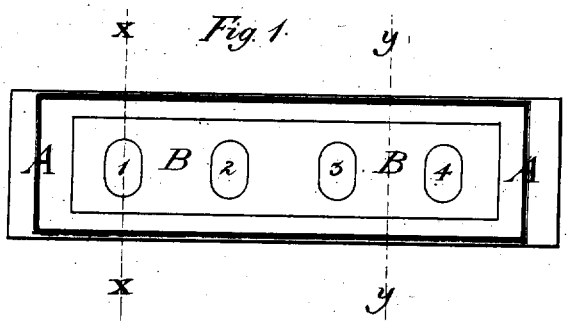
Figure 2:
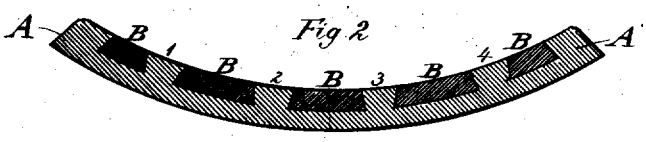
Figure 3:
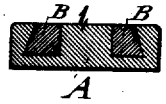
Figure 4:
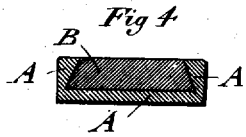

In the accompanying drawings, Figure 1 is a plan of the brake-shoe, showing its frictional bearing-face upward. Fig. 2 is a longitudinal and median vertical section through Fig. 1. Figs. 3 and 4 are vertical cross-sections through Fig. 1, taken at the lines X X and *y y*, respectively.

In the said figures, the letter A designates the cast-iron portion of the brake-shoe, backing and preferably bounding a curved wrought-iron bar, B, and perforating the said bar at the points 1 2 3 4.

This construction is accomplished by casting or molding the part A through, upon, and around the perforated bar B, the edges of the bar B and the perforations in the same being respectively and preferably beveled and tapered, as shown in the several figures of the drawings, for the purpose of more securely tying together the said bar and casting by a series of dovetail joints. The molten metal is thus run through as many perforations as may be desired, practically flush with the curved face of the bar B, and the two metals are (in service) soon brought to one uniform bearing-surface having the curve of the frictional circumference of the wheel.

Car-brake shoes as ordinarily constructed are made of cast-iron, in but one piece, or with a renewable face of the same material, secured in various ways, and not unfrequently bolted on by means of wrought-iron bolts. In this latter case the said bolts occupy and also practically become a part of the said renewable face or wearing-surface of such shoe, wearing down (in service) with the said cast-iron face, and forming a kind of combined shoe possessing some increased wearing capacity, but diminished strength, though still being substantially a cast-iron shoe. Car-brake shoes as thus ordinarily constructed are subject to much abrasion and rapid destruction of metal in the service of braking the wheels, and are liable also to become glazed, and thereby have their frictional qualities greatly impaired. Considerable mass and weight must likewise be given to such shoes to insure even a moderate degree of strength. For these reasons the car-brake shoes in general use are necessarily expensive and unsatisfactory at best.

Brake-shoes have also been made entirely of wrought-iron, and though greatly superior to cast-iron in wearing qualities, and also in strength, it has been found, however, that wrought-iron is not suitable by itself alone for the face of a brake-shoe, because of the tendency of its surface to cut and its particles to tear out under pressure and torsion when the wheels are rapidly rotating, the metal then being liable to become quickly heated and softened. So, too, wrought-iron and steel and malleable iron (or any one metal alone) are all, if used alone as the face of the shoe, liable at times to become glazed, and thus to have their frictional qualities seriously diminished; but a shoe having a face consisting, mainly, of wrought-iron or other suitable metal through or in which cast-iron is properly distributed presents a wearing brake-surface which not only opposes great frictional adherence and resistance, combined, also, with great strength, to the torsion of the wheel, but at the same time has no tendency either to tear or cut or to become glazed, because the continuity of similar particles of metal is so frequently broken by the proper distribution of dissimilar metals.

I am aware that brake-shoes have heretofore been made having a number of detached face-pieces of wrought-iron or other metal, or material not metal, inserted within a cast-iron body, the avowed purpose of such construction being to prolong the life or wearing qualities of the common cast-iron shoe by means of said detached face or bearing-pieces; but actual service has demonstrated that what has been gained in wear by such construction has been seriously diminished, if not entirely lost, by the resulting weakness, great liability to breakage, and general insecurity of such shoes, together with their necessarily excessive weight and consequent great expense. In point of fact all such shoes are substantially cast-iron shoes, differing materially in strength only from the bolted variety of common cast-iron shoes hereinbefore referred to, and greatly inferior to them in that respect, the said wrought-iron or other inserted pieces being wholly separate and detached, and therefore imparting no strength whatever to the brake-shoe, but, on the contrary, greatly weakening it, and performing the single function of a partial facial lining of but little coherence to the cast-iron body under the severe frictional and torsional strain of service, by which said pieces are frequently torn away from the cast-iron body of the shoe and scattered along the railroad-tracks.

My invention, on the contrary, is not a cast-iron shoe, but, as hereinbefore described, is a shoe having a large and strong portion of its body composed of a face-bar of wrought-iron or other suitable metal or material, forming a frictional or brake surface, the remaining portion of the shoe being a backing of cast-iron, introduced at suitable points or intervals into and through said face-bar, flush with its frictional surface, and, preferably, also bounding the edges of the said bar. The cast-iron thus backs and strengthens said face-bar, retains it securely in place, and also serves as the part by which the shoe is held in suitable position, and connected to the usual operating mechanism. This construction thus secures perfect immunity from the cutting and tearing of the particles of the wrought-iron or other material, which would otherwise ensue if too much homogeneous surface were exposed to the torsional friction of the car-wheels. Said construction, likewise, effectually prevents the glazing of the brake-surface or face of the shoe and consequent loss of brake efficiency, because the cast-iron portion suitably breaks up the continuity of the particles of the wrought-iron or other material of which the face of the shoe may be composed, as heretofore explained.

This unique distribution of two metals upon the face of my brake-shoe is thus not only involved in a construction which insures a superior durability and efficiency, and saves weight and expense of shoe, but it also performs in a perfect and much more satisfactory manner all the functions of the two metals as distributed in the two kinds of cast-iron brake-shoes above described, having brake-surfaces respectively composed of either wrought-iron bolt-heads intermingled with a cast-iron face plate or a cast-iron face having detached pieces of wrought-iron or other metal or material therein inserted. These severally-enumerated desiderata are thus accomplished by my composite brake-shoe.

The mutual support which the two metals give each other, particularly the tensile strength of the wrought-iron, enables the casting to be made much lighter than the ordinary cast-iron shoe, and the peculiar distribution of the metals, whose particles have different physical characteristics, greatly enhances the durability and efficiency of the shoe, as above explained. Not only, therefore, are quicker stoppages and greater safety to railroad-trains insured by the use of this brake-shoe, but a greatly-diminished cost for renewals and repairs of brake-shoes is likewise secured, and a large saving effected in car-wheels also, which, though they may still be fit for service in other respects, are frequently rendered worthless by reason of being worn flat from sliding on the rails, occasioned by the use of brake-shoes as generally constructed.

Having thus fully described my said improvement in car-brake shoes as of my invention, I claim—

1. A composite car-brake shoe consisting of but two parts, the one a rigid curved bar of wrought-iron or other suitable metal or material backed and preferably bounded by the other part, made of cast-iron and united to the former part in the manner described, substantially as and for the purposes set forth.

2. A composite car-brake shoe consisting of but two parts, the one of cast-iron having the other, of wrought-iron or other suitable metal or material, embedded therein in the form of a rigid curved bar provided with one or more perforations, wherein the cast-iron is molded, thereby tying and firmly securing the two parts of the shoe together, in the manner described, substantially as and for the purposes set forth.

3. A composite car-brake shoe consisting of but two parts, and provided with a face one part whereof is a rigid curved bar of wrought-iron or other suitable metal or material, and the remainder of said face and shoe of cast-iron, backing and preferably bounding said bar and perforating entirely through the same at one or more points, whereby the proper strength and durability of the shoe are effected and maintained, glazing of its face prevented, and the adhesive or frictional brake efficiency thereof increased, substantially as set forth.

JOHN F. CURTICE.

Witnesses:

ALLAN H. DOUGALL,
JAMES B. HARPER.